May 5, 1964  G. SAJECK  3,131,667
LOW PRESSURE WARNING APPARATUS
Filed April 6, 1962  2 Sheets-Sheet 1

INVENTOR
GEORGE SAJECK

BY Thomas W. Ehrmann

ATTORNEY

May 5, 1964 G. SAJECK 3,131,667
LOW PRESSURE WARNING APPARATUS
Filed April 6, 1962 2 Sheets-Sheet 2
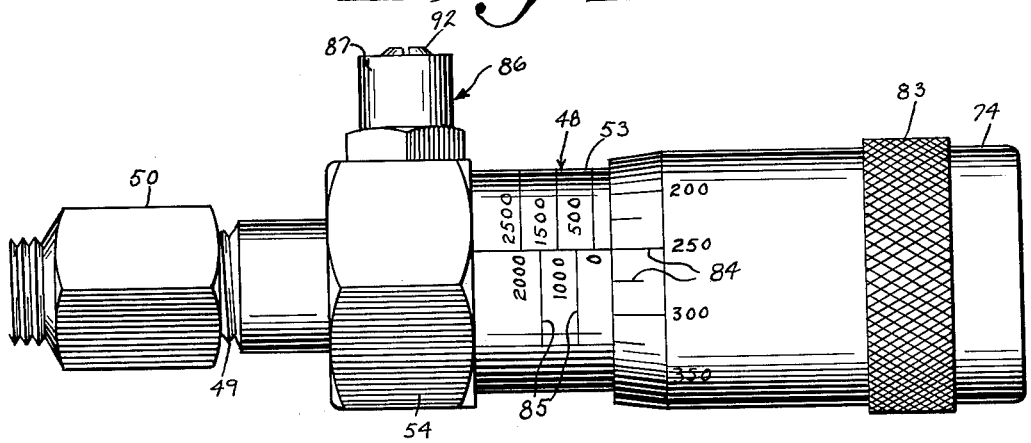
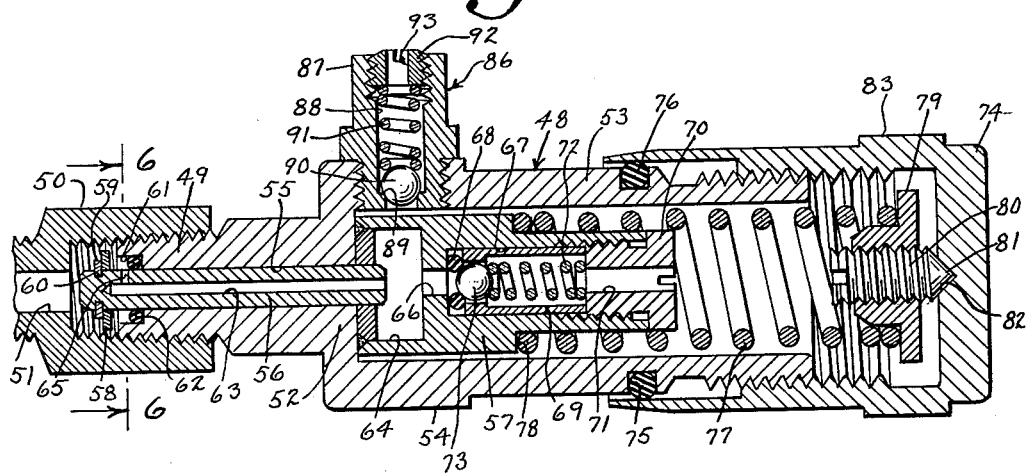
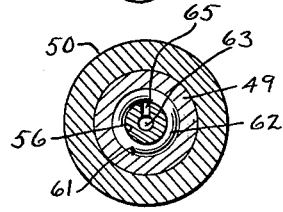
INVENTOR
GEORGE SAJECK
BY Thomas W. Ehrmann
ATTORNEY

United States Patent Office 3,131,667
Patented May 5, 1964

3,131,667
LOW PRESSURE WARNING APPARATUS
George Sajeck, 1324 N. 26th St., Milwaukee 5, Wis.
Filed Apr. 6, 1962, Ser. No. 185,627
7 Claims. (Cl. 116—70)

This invention relates to a low pressure warning apparatus for a source of compressed gas, and particularly to a warning apparatus for use with a source of compressed gas, which warming apparatus is responsive to the pressure of the compressed gas so as to produce an audible signal indication when the pressure of the compressed gas falls below a preselected level.

The apparatus of this invention is particularly useful to give warning of a low pressure in the compressed air tanks of self-contained underwater breathing apparatus. Self-contained underwater breathing apparatus, commonly termed scuba, normally includes a compressed air tank or tanks which afford the source of air to the scuba diver while submerged, a pressure regulator valve to reduce the pressure of the compressed air to an acceptable level for human consumption, and a mouthpiece leading from the outlet of the regulator valve. The supply of air available to the scuba diver is limited by the capacity of the compressed air tanks, and it is necessary that the scuba diver surface before his tanks have been completely emptied. Several devices have been used to assist the scuba diver in determining the quantity of compressed air available in the tanks to insure that the diver allows himself sufficient time to surface.

One device which has been employed for this purpose includes a pressure gauge connected through a flexible tubing to the compressed air tanks and responsive to the pressure therein. The pressure gauge has generally been secured to the upper front of the scuba diver's body so that he may continuously check the pressure and thereby determine the quantity of compressed air remaining. It will be appreciated that the use of a pressure gauge is cumbersome, adds considerably to the burden of the scuba equipment, and the effectiveness of the pressure gauge is entirely dependent upon the alertness of the diver.

A second class of devices employed for substantially the same purpose are known as safety reserve mechanisms. One form of a safety reserve mechanism includes a valve having a restricted orifice. The valve is connected between the compressed air tanks and the diver's mouthpiece and may be incorporated within the pressure regulator valve. The restricted orifice permits a sufficient quantity of air to pass therethrough providing that the pressure of the compressed air tanks is above a certain level. When the pressure falls below the level, the pressure is insufficient to pass a full supply of air through the restricted orifice and the diver senses the low pressure of his compressed air tanks by difficulty in breathing. When this reduction in air supply is noted by the diver, it is then necessary for him to operate a lever which mechanically opens the restricted orifice to provide adequate supplies of air.

A second form of safety reserve mechanism includes a spring loaded valve also disposed within the connection between the compressed air tanks and the diver's mouthpiece or as a part of the pressure regulator valve. Under adequate pressures within the compressed air tank, the force of the spring is overcome and a normal supply of air is delivered through the valve to the diver. Again, when the pressure within the compressed air tank falls below a certain level, the pressure is insufficient to overcome the spring within the valve whereby the valve closes somewhat and delivers a subnormal supply of air to the diver. Again, the diver must then manually operate a lever which either removes the spring from the valve or by-passes the spring loaded valve. Such safety reserve mechanisms are costly, add considerably to the burden of the scuba equipment and require affirmative action on the part of the scuba diver to restore a normal supply of air.

In comparison, the warning apparatus of this invention is compact, does not hinder bodily movement of the scuba diver, is unobtrusive, and requires neither action nor attention on the part of the scuba diver. The warning apparatus of this invention, when employed with scuba equipment, is connected to the outlet of the compressed air tank or tanks and is responsive to the pressure of the compressed air. When the quantity of the compressed air, which is directly reflected by the pressure, falls below a preselected level the apparatus of this invention emits an unmistakable audible signal. The signal thus produced is in the form of a cylic sound which is audible in the atmosphere and has been found to be amplified under water.

According to one embodiment of this invention, the warning apparatus may be provided with means for presenting a continuous visual indication of the quantity of compressed air remaining while at the same time providing an audible signal indication. According to still another embodiment of this invention, the warning apparatus may be provided for manual adjustment to permit selection of the air pressure level at which the audible signal indication will begin.

It is, therefore, a principal object of this invention to provide a low pressure warning apparatus for a source of compressed gas, which apparatus automatically produces an audible signal indication when the gas pressure falls below a preselected level.

It is another object of this invention to provide a compact, unobtrusive, underwater warning apparatus for scuba equipment which produces an audible signal indication when the quantity of compressed air within the tanks falls below a preselected level.

It is a further object of this invention to provide a low pressure warning apparatus for a source of compressed gas which will emit an audible signal when the gase pressure falls below a preselected level and which additionally provides a continuous visual indication of the gas pressure.

It is still a further object of this invention to provide a low pressure warning apparatus for a source of compressed gas which produces an audible signal when the gas pressure falls below a preselected level and which is manually adjustable for selecting the level at which the signal indication will be produced.

The foregoing and other objects and advantages of this invention will appear in the description to follow. In the description, reference is made to the accompanying drawings which form a part hereof and in which there is shown by way of illustration, specific forms in which this invention may be practiced. These forms will be described in detail to enable those skilled in the art to practice this invention but it is to be understood that other embodiments of the invention may be used and that structural changes in the embodiments described may be made by those skilled in the art without departing from the true scope of the present invention. Consequently, the following detailed description is not to be taken in a limiting sense and the scope of the present invention is best defined by the appended claims.

In the drawings:

FIG. 4 is a view in elevation of a second embodiment of this invention;

FIG. 5 is a view in vertical section of the apparatus of FIG. 4; and

FIG. 6 is a view in section taken in the plane represented by the line 6—6 in FIG. 5.

Figure 1:
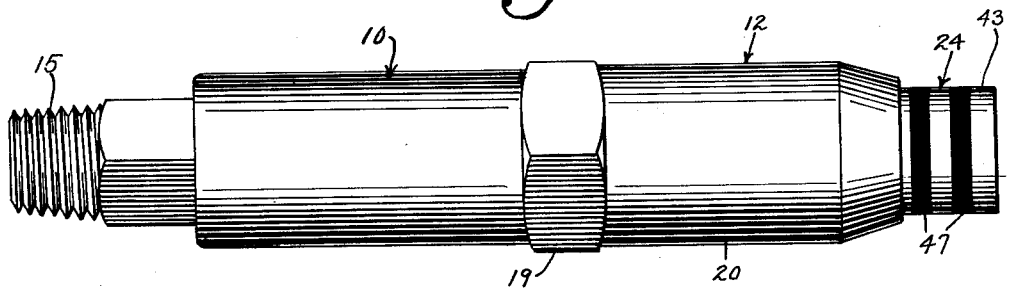
FIG. 1 is a view in elevation of one embodiment of this invention including a visual pressure indicator shown in an operative position.
Figure 2:
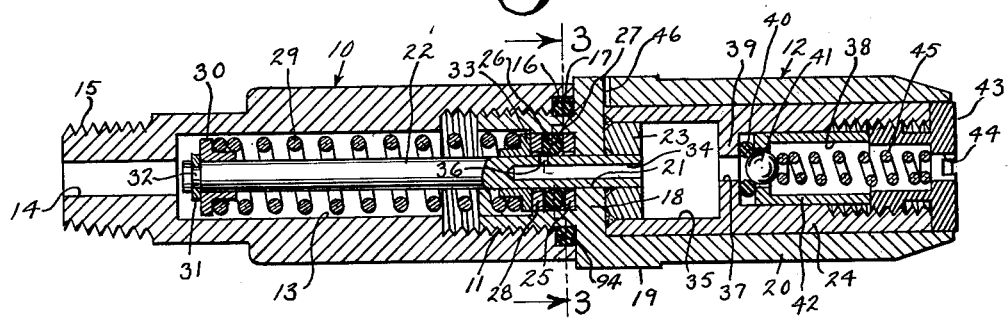
FIG. 2 is a view in vertical section of the apparatus of FIG. 1.
Figure 3:
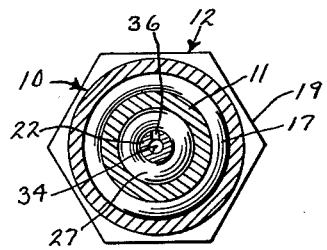
FIG. 3 is a view in section taken in the plane represented by the line 3—3 of FIG. 2.

Referring now to the drawings and particularly to FIGS. 1, 2 and 3, the apparatus of this invention may include a hollow cylinder member 10 which is internally threaded at one end to receive a projecting threaded portion 11 of a casing 12. The cylinder member 10 is provided with a central bore 13 which leads from the internally threaded end and terminates in a smaller bore which defines an inlet 14. The end of the cylinder member 10 including the inlet 14 is provided with an externally threaded portion 15. The internally threaded end of the cylinder member 10 includes a counterbore 16 concentric with the central bore 13 and which defines a shoulder 94, and a flexible sealing ring 17 is seated between this shoulder and one face of a transverse wall 18 of the casing 12. The casing 12 includes a hexagonal nut configuration 19 formed integral with the casing and a sleeve portion 20 which extends outwardly from the wall 18.

The transverse wall 18 of the casing 12 is provided with a central opening 21, and a rod 22 is journaled through the opening 21 for longitudinal movement. One end of the rod 22 is secured to an end wall 23 of a plunger 24 which is disposed for longitudinal movement within the interior of the sleeve portion 20. The rod 22 and plunger 24 comprise a pressure actuated means, and when the plunger 24 is fully seated within the sleeve portion 20 with the end wall 23 abutting against the wall 18 of the casing 12, the rod 22 extends throughout a substantial length of the central bore 14 of the cylinder member 10.

A washer 25 is received within a counterbore 26 provided in the threaded portion 11 of the casing 12 and the washer 25 is seated against the transverse wall 18. A resilient sealing ring 27 is likewise received within the counterbore 26 against the washer 25 and is held in place by a second washer 28. The washers 25 and 28 fit loosely about the rod 22, but the sealing ring 27 seals the periphery of the rod 22 from the interior of the cylinder member 10. A relatively stiff helical spring 29 encircles the rod 22 with one end resting against a collar 30 disposed about the shaft 22 and in turn seated against a circumferentially contractible retaining ring 31 received in an annular groove 32 adjacent the free end of the rod 22. The other end of the spring 29 rests against a second collar 33 disposed about the rod 22 and seated against the washer 28. It will be seen that the helical spring 29 normally urges the rod 22 and attached plunger 24 longitudinally to the left as viewed in FIG. 2. One end of the spring 29 acts through the second collar 33, the washer 28, the sealing ring 27, and the washer 25 against the transverse wall 18 which is the ultimate support for the spring 29. Thus, in addition to performing its main function of urging the rod 22 and plunger 24 longitudinally to the left, the spring 29 tends to flatten the sealing ring 27 to result in a more effective sealing of the periphery of the rod 22.

The rod 22 is provided with an axial bore 34 adjacent one end which opens into a chamber 35 provided in the plunger 24 and defined in part by the end wall 23. A restricted orifice 36 extends radially from the axial bore 34 to the periphery of the rod 22 to provide a restricted passage between the axial bore 34 and the exterior of the rod 22 (see FIG. 3). The orifice 36 is positioned along the length of the rod 22 a suitable distance so that when the plunger 24 is withdrawn almost entirely within the sleeve portion 20, the orifice 36 will lie to the outside or cylinder side of the sealing ring 27 where it is exposed to the interior of the cylinder member 10, as shown in FIG. 2.

The plunger 24 is also provided with a chamber outlet 37 which communicates with the chamber 35 and a central bore 38 concentric with the chamber outlet 37. The outlet 37 and bore 38 form a shoulder portion 39 and a resilient ring 40 of circular cross section is seated upon the shoulder portion 39 to act as a valve seat for a ball 41. The resilient ring 40 is held in place against the shoulder portion 39 by a sleeve member 42 restrained within the bore 38 by a cap member 43. The cap member 43 is received in threaded engagement within the bore 38 of the plunger 24 and is provided with an opening 44 which communicates with the interior of the sleeve member 42 to define a discharge port leading from the outlet 37 to the exterior of the plunger 24. A relatively weak, second helical spring 45 is biased at one end against the cap member 43 and at its other end against the ball 41 to normally urge the ball 41 against the resilient ring 40 and to thereby close the chamber outlet 37. A radially extending bleeder hole 46 is provided through the casing 12 adjacent the end wall 18 and leads from the exterior of the casing 12 to the interior of the sleeve portion 20.

The exterior surface of the plunger 24 adjacent the outermost end thereof is provided with a series of annular bands 47 which form pressure indicia. The arrangement and function of the bands 47 will be described hereafter.

In operation, the warning apparatus is connected to a source of compressed gas and, when employed with scuba equipment, is connected either directly to the compressed air tanks or formed as a part of the regulator valve. The warning apparatus may be attached to a standard connection by threading the externally threaded portion 15 of the cylindrical member 10 into the connection with the aid of the hexagonal nut configuration 19. When connected, compressed air will flow through the inlet 14 and fill the central bore 13 of the cylinder member 10. The sealing ring 17 prevents leakage of compressed air through the mating threads of the cylinder member 10 and the casing 12. Escape of compressed air through the central opening 21 in the transverse wall 18 of the casing 12 is prevented by the sealing ring 27.

Compressed air within the central bore 13 will exert a force upon the free end of the rod 22 and will tend to force the rod 22 longitudinally through the opening 21 and against the force of the spring 29. Thus, the longitudinal position of the pressure actuated means comprising the rod 22 and the plunger 24 within the cylinder member 10 and casing 12 will be determined, in each instance, by the net force resulting from the opposing forces of the compressed air and the spring 29. When the compressed air pressure is above a preselected level, which level is selected as indicating a minimum sufficient quantity of compressed air not requiring replenishment, the pressure actuated means is moved to an extended position or positions where the restricted orifice 36 lies to the casing side of the sealing ring 27 thereby preventing the entrance of air from the central bore 13 through the orifice 36. When the compressed air pressure falls below such preselected level, the pressure actuated means is moved to a retracted position or positions where the restricted orifice 36 lies to the cylinder member side of the sealing ring 27 and the orifice 36 is then exposed to the compressed air within the central bore 13. The pressure level at which the pressure actuated means moves from its extended positions to its retracted positions may be established initially by the selection of a spring 29 of the proper stiffness. The compressed air tanks of scuba equipment are normally charged to a maximum pressure of 2000 p.s.i. and the preselected level may be established, for example, as 300 p.s.i. When the air pressure falls to 300 p.s.i., there is a sufficient quantity of compressed air remaining for the scuba diver to surface to replenish his supply. It will be appreciated, however, that the preselected level may be set at any reasonable value desired.

Adjustment of the value of the preselected level of pressure may be made by adding additional washers at either end of the spring 29 to shorten the normal length of the spring 29.

When the pressure actuated means is in an extended position or positions, the bands 47 on the surface of the plunger 24 are exposed and may be viewed beyond the end of the sleeve portion 20 of the casing 12 with the outer edge of the sleeve portion 20 acting as a gauge line for reading of the bands 47, as shown in FIG. 1. It will be appreciated that the number of bands 47 which are exposed beyond the sleeve portion 20 is directly proportional to the pressure of the compressed air. Thus, the bands 47 may be color coded to pressure ranges for visual indication of the compressed air pressure. For example, the innermost band may be white and may be exposed when the compressed air pressure is between 2000 and 1500 p.s.i. The next band may be green for a pressure range of 1500 to 1000 p.s.i., the third band may be yellow for a pressure range of 1000 to 500 p.s.i., and the final band may be red and will be the only band exposed when the air pressure falls to and below 500 p.s.i.

As the plunger 24 is moved outwardly of the sleeve portion 20 to the extended positions, water or air, depending upon the environment, is drawn through the bleeder hole 46 so that the formation of a vacuum or area of reduced pressure between the transverse wall 18 of the casing 12 and the end wall 23 of the plunger 24 is prevented.

When the pressure within the tank decreases to the preselected level as air is consumed, the pressure actuated means will retreat to a retracted position. As noted above, when the pressure actuated means is in its retracted position or positions, the orifice 36 lies to the cylinder member side of the sealing ring 27. Thus, as shown in FIG. 2, the sealing ring 27 no longer prevents the entrance of compressed air to the orifice 36 from the central bore 13, and air will be forced under pressure through the restricted orifice 36 into the bore 34 and the chamber 35. The pressure of the compressed air forced through the orifice 36 will be reduced once it has entered the bore 34 and chamber 35. The bore 34 and chamber 35 act as an accumulation chamber for the compressed air and, initially, the quantity of air within such accumulation chamber, and consequently its pressure, are insufficient to overcome the force of the spring 45. However, when a sufficient quantity of air has been accumulated within the bore 34 and chamber 35 the pressure will rise to a level where it will overcome the force of the spring 45 and the ball 41 will be moved from its seat upon the ring 40 and the compressed air accumulated within the bore 34 and chamber 35 will escape through the outlet 37 and thence to the exterior through the discharge port in the plunger 24.

The air accumulated within the bore 34 and chamber 35 will exhaust through the outlet 37 very suddenly when the force of the spring 45 is overcome. This produces what may best be described as an exploding sound. As soon as the bore 34 and chamber 35 have been exhausted of the majority of the compressed air accumulated therein, the spring 45 will return the ball 41 to its seat upon the resilient ring 40 thereby closing the outlet 37. The orifice 36 remains exposed to the compressed air within the central bore 13 and the axial bore 34 and chamber 35 is recharged with another accumulation of air through the orifice 36 until the pressure is again sufficient to overcome the spring 45 to move the ball 41 away from the ring 40 and to thereby permit a sudden exhaustion of the air to the exterior of the apparatus. This cyclic accumulation of air and exhaustion of air produces an intermittent exploding sound which is highly audible either in the atmosphere or under water. It is this intermittent sound which warns the diver when the pressure of the compressed air within his tanks falls to a preselected level.

When the supply of compressed air is nearly exhausted, the pressure of the compressed air will be insufficient to cause an accumulation of sufficient pressure within the bore 34 and chamber 35 to overcome the spring 45 and the warning apparatus is silenced. When the diver initially hears the audible signal, he should surface to obtain a new supply of compressed air. When the warning apparatus becomes silent after having emitted its audible signal, the diver is thereby given notice that the air supply is critical and he should immediately resurface.

Referring to FIGS. 4 through 6, a second embodiment of this invention may be provided with the feature of manual adjustability of the preselected level at which the audible signal will be emitted. A casing 48 is provided at one end with an externally threaded portion 49 which is adapted to be received in threaded engagement within a hollow member 50 having a bore defining an inlet 51. The member 50 may likewise be provided with a threaded portion at one end for connection to the compressed air tanks. The casing 48 is provided with a transverse wall portion 52 and a sleeve portion 53 extends outwardly from the wall portion 52. The periphery of the casing 48 adjacent the wall portion 52 may be provided with a hexagonal nut configuration 54 for assistance in mounting the warning apparatus. The transverse wall portion 52 is provided with a central opening 55 which receives a rod 56. One end of the rod 56 extends into the interior of the member 50 and a plunger 57 is secured to the opposite end of the rod 56 within the sleeve portion 53 of the casing 48. A washer 58 is disposed about the free end of the rod 56 and is restrained thereon by a circumferentially contractible retaining ring 59 disposed within an annular groove 60 in the rod 56. A counterbore 61 concentric with the central opening 55 of the casing 50 is provided in the externally threaded portion 49 to form a shoulder against which a resilient sealing ring 62 is seated.

The rod 56 is provided with an axial bore 63 which terminates short of the free end of the rod 56 and which opens into a chamber 64 provided in the plunger 57. A restricted orifice 65 leads radially from the axial bore 63 to the periphery of the rod 56, as shown in FIGS. 5 and 6. The plunger 57 is also provided with a chamber outlet 66 and a bore 67 concentric with the outlet 66 extends from one end of the plunger 57 to define a shoulder with the outlet 66. A resilient ring 68 forming a valve seat is seated against the shoulder thus formed and held in place by a sleeve 69 disposed within the bore 67. The sleeve 69, in turn, is held in place by a cap member 70 which is threadedly received within the plunger 57 and which biases against the sleeve 69. The cap member 70 is provided with a central hole 71 which together with the sleeve 69 defines a discharge port leading from the outlet 66 to the exterior of the plunger 57. A relatively weak spring 72 biases at one end against the cap member 70 and at its other end against a ball 73 for normally urging the ball 73 against the resilient ring 68 to close the outlet 66.

A closure cap 74 closes the open end of the casing 48 by being received in threaded engagement with the sleeve portion 53. An annular groove 75 provided in the periphery of the sleeve portion 53 receives a resilient sealing ring 76 to prevent moisture from entering the interior of the casing 48 through the mating threads of the casing 48 and the closure cap 74. A relatively stiff helical spring 77 is disposed within the casing 48 and rests at one end against a shoulder 78 provided on the plunger 57 and at the other end against a collar member 79 provided with a threadedly received stud 80 having a pointed end 81 which is received within a detent 82 provided in the interior of the closure cap 74.

Referring to FIG. 4, the closure cap 74 is provided with a knurled portion 83 for manual grasping of the closure cap 74, and the end of the closure cap 74 is tapered and provided with suitable graduations 84 which cooperate with graduations 85 provided on the surface of the sleeve portion 53, the function of which will be hereinafter described.

A check valve assembly 86 includes a housing 87 which is threadedly received within a tapped hole in the casing 48. The housing 87 is provided with a central bore 88 terminating in a seat 89 against which a ball valve 90 rests. A spring 91 normally urges the ball valve 90 against the seat 89 and is biased at one end against a nut 92 threadedly engaged within the end of the housing 87 and provided with a central opening 93 providing a passage to the exterior of the apparatus.

The operation of the embodiment shown in FIGS. 4 through 6 is similar to that of the embodiment previously described. That is, the hollow member 50 is connected to the source of compressed air. When so connected, compressed air will enter the inlet 51 and will exert a force upon the free end of the rod 56 against the force of the spring 77. The position of the pressure actuated means comprising the rod 56 and plunger 57 is determined by the net force resulting from the opposing forces of the compressed air and the spring 77, and the extent of longitudinal movement is limited by the washer 58. Again, therefore, the pressure actuated means is movable between an extended position when the compressed air pressure is above the preselected level and a retracted position when the compressed air pressure falls below the preselected level. In the extended position, the restricted orifice 65 lies on the casing side of the sealing ring 62 thereby preventing the entrance of compressed air through the orifice 65 to the axial bore 63 and the chamber 64, while in the retracted position the orifice 65 lies to the hollow member side of the sealing ring 62 and compressed air may pass through the restricted orifice 65. The axial bore 63 and chamber 64 act as an air accumulation chamber and, since the pressure of the compressed air will fall once it passes through the orifice 65, a quantity of air must be accumulated in the bore 63 and chamber 64 to overcome the force of the spring 72. When the quantity of air accumulated is sufficiently great so that the pressure within the bore 63 and chamber 64 has been raised to a level where the pressure will overcome the spring 72, the ball 73 will be forced away from the resilient ring 68 thereby permitting the air within the bore 63 and chamber 64 to discharge through the outlet 66. The discharge is very sudden, and the discharged air will be exhausted to the exterior of the warning apparatus through the check valve assembly 86. The cycle of accumulation of air and exhaustion of air is repeated, and an intermittent audible signal is produced within the casing 48. The discharge of the air from the interior of the casing 48 through the check valve assembly 86 is gradual and does not contribute to the audible signal.

The preselected level at which the warning apparatus will emit its audible signal may be adjusted by adjusting the length of the spring 77 by means of the closure cap 74. The graduations 85 on the casing 48 form a linear scale in which each graduation 85 represents 500 p.s.i., and the graduations 84 on the closure cap 74 form a cylindrical scale cooperating with the linear scale of the casing 48 and each graduation 84 of the cylindrical scale represents an increment of 50 p.s.i. Thus, it will be appreciated that in a well known manner turning of the closure cap 74 in a clockwise direction thereby advancing the closure cap 74 along the length of the casing 48 will result in a variable adjustment of the spring 77 and the linear and cylindrical scales present a reading of the pressure at which the audible signal will be emitted. Thus, the warning apparatus shown in FIGS. 4 through 6 is adjustable through a full range of normal pressures existing in compressed air tanks in scuba equipment.

The size of the restricted orifices 36 and 55 illustrated in the drawings has been greatly exaggerated for clarity of presentation. In actual construction, the restricted orifices 36 and 65 are very small, and adequate results have been obtained by providing the orifices 36 and 65 with a diameter in the range of 0.003 inch to 0.005 inch. Because of the small opening presented by the orifice 36 or 65, the warning apparatus of this invention utilizes only a slight quantity of compressed air to produce the audible signal, and such low consumption of air is most desirable in the case of use with scuba equipment since it makes little demand upon the already reduced compressed air supply.

It will be seen from the foregoing description that the low pressure warning apparatus of this invention provides an extremely effective means of indicating to a scuba diver that the quantity of compressed air remaining in his tanks has been reduced to a level where it is necessary for him to resurface. The audible signal, consisting of intermittent explosive sounds, produces an unmistakable indication to the diver. The sound emitted is audible in a normal atmosphere and is amplified under water.

While the apparatus of this invention has been described as operating upon scuba equipment it will be appreciated that the apparatus may be employed as a low pressure warning apparatus for any source of gas under pressure. Furthermore, while the operation of the warning apparatus has been described in terms of a consumption of the gas supply, it will be appreciated that the apparatus functions also to indicate sudden drops in pressure to a level requiring action, as for example, when the gas container is damaged thereby permitting escape of the gas.

Although the apparatus has been described as including a ball which normally closes the chamber outlet, other closure means, such as a spring loaded poppet valve, may be employed without departing from the scope of this invention.

I claim:

1. A low pressure warning apparatus comprising: a hollow member having an inlet adapted for connection to a source of compressed gas; a transverse wall sealing one end of said hollow member and provided with a longitudinal opening therethrough; pressure actuated means including a rod journaled for movement through said opening and which has one end extending within the interior of said hollow member, and a plunger secured to an opposite end of said rod, said plunger including a gas accumulation chamber and a chamber outlet; biasing means biased between said hollow member and said rod and urging said pressure actuated means against the force exerted by the compressed gas on said one end of said rod; said pressure actuated means being movable between an extended position under the force exerted by the compressed gas and a retracted position under the force of said biasing means when the pressure of the gas decreases to a preselected level; said rod having an axial bore adjacent said opposite end and communicating with said chamber, and said rod also having a restricted orifice providing a restricted passage between the interior of said hollow member and said axial bore when said pressure actuated means is in said retracted position; means sealing said restricted orifice from the interior of said hollow member when said pressure actuated means is in said extended position; and means normally closing said chamber outlet and adapted to be opened by gas pressure when a predetermined quantity of gas has been accumulated within said chamber, whereby an audible signal is produced by a cyclic accumulation of gas and exhaustion of gas from said chamber when said pressure actuated means is in said retracted position.

2. A low pressure warning apparatus comprising: a hollow member having an inlet adapted for connection to a source of compressed gas; a transverse wall sealing one end of said hollow member and provided with a longitudinal opening therethrough; pressure actuated means including a rod journaled for movement through said opening and which has one end extending within the interior of said hollow member, and a plunger secured to an opposite end of said rod, said plunger including a gas accumulation chamber, a chamber outlet and a discharge port leading from said chamber outlet to the exterior of said plunger; biasing means biased between said hollow member and said rod and urging said pressure actuated means against the force exerted by the compressed gas on said one end of said rod; said pressure actuated means being movable between an extended position under the force exerted by the compressed gas and a retracted position under the force of said biasing means when the pressure of the gas decreases to a preselected level; said rod having an axial bore adjacent said opposite end and communicating with said chamber, and said rod also having a restricted orifice providing a restricted passage between the interior of said hollow member and said axial bore when said pressure actuated means is in said retracted position; means sealing said restricted orifice from the interior of said hollow member when said pressure actuated means is in said extended position; resilient valve seat means at said chamber outlet exterior of said chamber; a ball within said discharge port adapted to seat on said valve seat means; and ball biasing means within said discharge port and normally urging said ball against said valve seat means to close said chamber outlet and adapted to be overcome by gas pressure against said ball when a predetermined quantity of gas has been accumulated within said chamber, whereby an audible signal is produced by a cyclic accumulation of gas and exhaustion of gas from said chamber when said pressure actuated means is in said retracted position.

3. A low pressure warning apparatus comprising: a casing having a transverse wall provided with a longitudinal opening therethrough and a sleeve portion extending longitudinally from said transverse wall; a hollow member secured at one end to said wall and having an inlet adapted for communication with a source of compressed gas; pressure actuated means comprising a rod journaled for longitudinal movement through the opening in said wall and having one end extending within the interior of said hollow member and an axial bore adjacent an opposite end, said rod also having a restricted radial orifice providing a passage between the periphery of said rod and said axial bore, and a plunger secured to said opposite end of said rod and disposed within said sleeve portion, said plunger including a chamber communicating with said axial bore, a chamber outlet, and a discharge port leading from said chamber outlet to the exterior of said plunger; sealing means sealing the periphery of said rod from the interior of said hollow member; biasing means normally urging said pressure actuated means against the force exerted by the compressed gas on said one end of said rod; said pressure actuated means being movable between an extended position under the force exerted by the compressed gas and a retracted position under the force of said biasing means when the pressure of the gas decreases to a preselected level, said restricted orifice being open to the interior of said hollow member when the pressure actuated means is in said retracted position and being sealed from the interior of said cylinder member by said sealing means when said pressure actuated means is in said extended position; and means normally closing said chamber outlet and adapted to be opened by gas pressure when a predetermined quantity of gas has been accumulated within said chamber when said pressure actuated means is in said retracted position.

4. A low pressure warning apparatus comprising: a casing having a transverse wall provided with an opening therethrough and a sleeve portion extending longitudinally from said wall; a hollow member secured at one end to said wall and having an inlet adapted for communication with a source of compressed air; pressure actuated means comprising a rod journaled for movement through said opening and which has one end extending within the interior of said hollow member and an axial bore adjacent an opposite end, and a plunger secured at one end to said opposite end of said rod and disposed for longitudinal movement within said sleeve portion and including a chamber communicating with said axial bore, and a chamber outlet, said plunger also including longitudinally readable pressure level indicia means adjacent an opposite end; biasing means urging said pressure actuated means against the force exerted by the compressed gas on said one end of said rod; said pressure actuated means being movable between extended positions under the force exerted by the compressed gas to expose said indicia means beyond the end of said sleeve portion in proportion to the pressure of the gas and a retracted position under the force of said biasing means when the pressure of the gas decreases to a preselected level; said rod having a restricted orifice providing a restricted passage between the interior of said hollow member and said axial bore when said pressure actuated means is in said retracted position; means sealing said restricted orifice from the interior of said hollow member when said pressure actuated means is in said extended position; and means normally closing said chamber outlet and adapted to be opened by gas pressure when a predetermined quantity of gas has been accumulated within said chamber, whereby an audible signal is produced by a cyclic accumulation of gas and exhaustion of gas from said chamber when said pressure actuated means is in said retracted position.

5. A low pressure warning apparatus comprising: a casing having a transverse wall provided with a longitudinal opening therethrough and a sleeve portion extending longitudinally from said wall and terminating in an open end; a hollow cylinder member secured at one end to said wall and having an inlet at its other end adapted for communication with a source of compressed gas; pressure actuated means comprising a rod journaled for longitudinal movement through said opening in said wall and having one end extending within the hollow interior of said cylinder member and an axial bore adjacent an opposite end, said rod also having a restricted orifice providing a restricted passage between the periphery of said rod and said axial bore, and a plunger secured at one end to said opposite end of said rod and disposed for longitudinal movement within said sleeve portion, said plunger including a chamber communicating with said axial bore, a chamber outlet, and a discharge port leading from said chamber outlet to the exterior of said plunger, said plunger provided adjacent an opposite end with a longitudinal array of annular bands indicative of selected pressure levels; a resilient sealing ring disposed about said rod and sealing the periphery of said rod from the interior of said cylinder member; a spring normally urging said pressure actuated means against the force exerted by the compressed gas on said one end of said rod; said pressure actuated means being movable between extended positions under the force exerted by the compressed gas to expose said bands beyond the open end of said sleeve portion in proportion to the pressure of the gas and a retracted position under the force of said spring when the pressure of the gas decreases to a preselected level, said restricted orifice being open to the interior of said cylinder member when the pressure actuated means is in said retracted position and being sealed from the interior of said cylinder member by said sealing ring when said pressure actuated means is in said extended positions; a resilient ring forming a valve seat at said outlet exterior of said chamber; a ball adapted to be seated on said valve seat; and a second spring normally urging said ball against said valve seat to close the outlet of said chamber and adapted to be overcome by gas pressure against said ball when a predetermined quantity of gas has been accumulated with said axial bore and said chamber.

6. A low pressure warning apparatus comprising: a casing having a transverse wall provided with an opening therethrough and a sleeve portion extending longitudinally from said wall and terminating in a threaded portion; a hollow member secured at one end to said wall and having an inlet adapted for communication with a source of compressed air; pressure actuated means comprising a rod journaled for movement through said opening and which has one end extending within the interior of said hollow member and an axial bore adjacent an opposite end, and a plunger secured at one end to said opposite end of said rod and disposed for longitudinal movement within said sleeve portion and including a chamber communicating with said axial bore and a chamber outlet; a closure cap received in threaded engagement upon the threaded portion of said sleeve; a spring biasing at one end against said plunger and at an opposite end against said closure cap and urging said pressure actuated means against the force exerted by the compressed gas on said one end of said rod; said pressure actuated means being movable between an extended position under the force exerted by the compressed gas and a retracted position under the force of said biasing means when the pressure of the gas decreases to a preselected level; said rod having a restricted orifice providing a restricted passage between the interior of said hollow member and said chamber when said pressure actuated means is in said retracted position; means sealing said restricted orifice from the interior of said hollow member when said pressure actuated means is in said extended position; and means normally closing said chamber outlet and adapted to be opened by gas pressure when a predetermined quantity of gas has been accumulated within said chamber, whereby an audible signal is produced by a cyclic accumulation of gas and exhaustion of gas from said chamber when said pressure actuated means is in said retracted position; said closure cap being movable longitudinally relative to said sleeve portion to adjust the normal length of said spring and thereby to adjust said preselected level.

7. A low pressure warning apparatus comprising: a casing having a transverse wall provided with a longitudinal opening therethrough and a sleeve extending longitudinally from said wall and terminating in an externally threaded portion; a hollow member secured at one end to said wall and having an inlet adapted for communication with a source of compressed gas; pressure actuated means comprising a rod journaled for longitudinal movement through said opening in said wall and having one end extending into the interior of said hollow member and an axial bore adjacent an opposite end, said rod also having a restricted orifice providing a restricted passage between the periphery of said rod and said axial bore, and a plunger secured to said opposite end of said rod within said sleeve portion and including a chamber communicating with said axial bore, a chamber outlet, and a discharge port leading from said chamber outlet to the exterior of said plunger; a closure cap received in threaded engagement upon the threaded portion of said sleeve and closing said casing means sealing the periphery of said rod from the interior of said hollow member; a first spring biasing at one end against said plunger and an opposite end against said closure cap and urging said pressure actuated means against the force exerted by the compressed gas on said one end of said rod; said pressure actuated means being movable between an extended position under the force exerted by the compressed gas and a retracted position under the force of said spring when the pressure of the gas decreases to a preselected level, said restricted orifice being open to the interior of said hollow member when the pressure actuated means is in its retracted position and being sealed from the interior of said cylinder member by said sealing means when said pressure actuated means is in its extended position; resilient valve seat means at said outlet exterior of said chamber; a ball adapted to be seated on said valve seat means; a second spring normally urging said ball against said valve seat means to close the outlet of said chamber and adapted to be overcome by gas pressure against said ball when a predetermined quantity of gas has been accumulated within said axial bore and said chamber; and check valve means providing a discharge opening from the interior of said casing; said closure cap being movable longitudinally relative to said sleeve to adjust the load on said first spring to adjust said preselected level and said closure cap and said sleeve being provided with cooperaing calibrations related to the load of said first spring.

References Cited in the file of this patent
UNITED STATES PATENTS
1,368,400    Kelley  ---------------- Feb. 15, 1921